United States Patent Office 3,543,168
Patented Nov. 24, 1970

3,543,168
ELECTRONIC CIRCUIT COMPRISING LINEAR AND LOGARITHMIC D.C. MEASURING CHANNELS DESIGNED FOR SIMULTANEOUS OPERATION
Jacky Weill, Saint-Cloud, France, assignor to Commissariat a l'Energie Atomique, Saint-Cloud, France
Filed Oct. 16, 1967, Ser. No. 675,375
Claims priority, application France, Nov. 7, 1966, 82,816
Int. Cl. G06g 7/24
U.S. Cl. 328—145                  1 Claim

ABSTRACT OF THE DISCLOSURE

The circuit provides simultaneous linear and logarithmic D.C. measuring channels and comprises a detector which supplies a current to an amplifier, a diode having a logarithmic characteristic, and the complete assembly comprises an output which constitutes a linear measuring channel and an operational amplifier whose output constitutes a purely logarithmic measuring channel.

---

This invention is concerned with an electronic circuit arrangement comprising linear and logarithmic measuring channels which are supplied with direct current and work simultaneously.

It frequently proves necessary in electronics (for example for the control of nuclear reactors or for radiation protection) to make use of a logarithmic measuring channel in conjunction with a linear measuring channel in order to derive benefit in one case from the measuring range and from the ease of elaboration of the period and in the other case from the accuracy of measurement provided. In point of fact, it would prove an advantage to be able to take both measurements simultaneously by means of a single electronic circuit. Not only would this achieve an appreciable economy in the installation, but operational safety would also be obtained by virtue of a perfectly continuous measurement.

Accordingly, the present invention is specifically directed to an electronic circuit which takes the two above-mentioned measurements simultaneously.

More precisely, this invention relates to an electronic circuit comprising linear and logarithmic D.C. measuring channels designed for simultaneous operation, said circuit being characterized in that it comprises a detector which supplies a direct current having an intensity I to an amplifier having a load impedance which is constituted by a resistor mounted with negative feedback, a diode having a logarithmic characteristic, and the complete assembly comprises a first output which constitutes a linear measuring channel (voltage developed across the terminals of the load resistor) and a second output at a potential which is equal to the sum of the potential of said first output and of a logarithmic potential (voltage across the terminals of the diode) an operational amplifier whose input is coupled directly to said second output, and a paraphase amplifier connected on the one hand to said first output and on the other hand to the input of said operational amplifier with the result that the output of this latter constitutes a purely logarithmic measuring channel.

Figure 1:
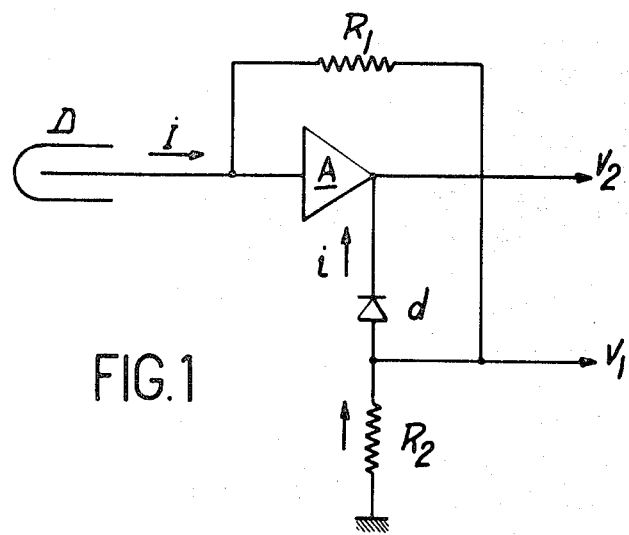
Figure 2:
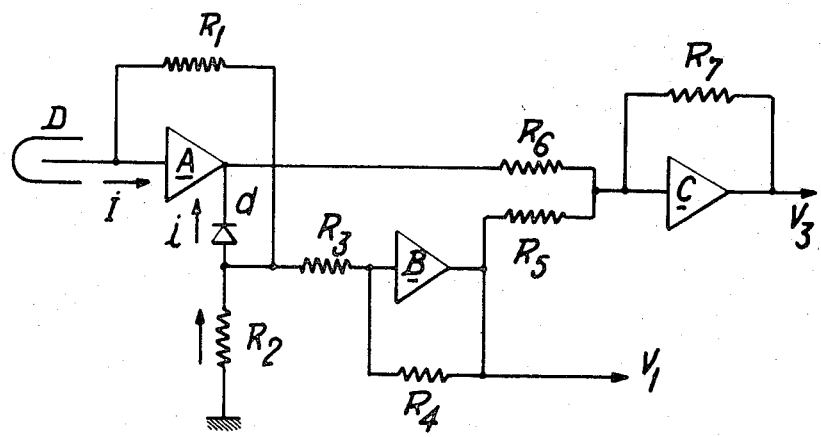

One form of execution of the invention is shown by way of example in the accompanying drawings, in which:

FIG. 1 is a schematic diagram of the upstream section of the electronic circuit according to the invention; and FIG. 2 is a schematic diagram of the complete electronic circuit.

Referring to FIG. 1, let D designate a detector which supplies a direct current to an amplifier A possessing negative feedback of cathode obtained through the resistor R2 and let $V = K \log i/i_0$, $i_0$ being a constant designate the law of the current within the diode $d$ (this law being turned to useful account in conventional logarithmic amplifiers).

The circuit of FIG. 1 shows that the output voltages $V_1$ and $V_2$ have the following values respectively: $V_1 = R_1 I$ $$V_2 = V + V_1 = K \log I/i_0 \cdot (R_1 - R_2/R_2 + R_1 I)$$

There is therefore obtained a linear measuring output $V_1$ and an output having a potential $V_2$ which is the sum of a logarithmic law and of a linear law.

In the complete diagram of the device according to the invention (FIG. 2), the paraphase amplifier B has the function of bringing $V_1$ into step with $V_2$ in order to be able to deduct from $V_2$ the potential $V_1$ of the linear output channel, with the final result that one of the two outputs is a linear measurement $V_1$ and the other output (output of the operational amplifier C) is a purely logarithmic measurement $V_3$.

In accordance with a practical form of construction, the resistors of the circuit according to the invention are given the following values:

$R_1 = 10^4$ ohms, $R_2 = 5.10^3$ ohms.
$R_3 = R_4 = R_5 = R_6 = 10^7$ ohms and $R_7 = 1.25.10^8$ ohms and in respect of the value $K = 10^{-1}$ of the constant of the diode $d$, the following linear and logarithmic responses are obtained with a current which varies from $10^{-11}$ to $10^{-3}$ amp.

| I Amps | | | | | | $10^{-11}$ | $10^{-10}$ | $10^{-9}$ | $10^{-8}$ | $10^{-7}$ | $10^{-6}$ | $10^{-5}$ | $10^{-4}$ | $10^{-3}$ |
|---|---|---|---|---|---|---|---|---|---|---|---|---|---|---|
| $V_1$ (linear channel in volts) | | | | | | | | | | $10^{-3}$ | $10^{-2}$ | $10^{-1}$ | 1 | 10 |
| $V_3$ (logarithmic channel in volts) | 0 | 1.25 | 2.5 | 3.75 | 5 | 6.25 | 7.5 | 8.75 | 10 |

Other values are possible and, in particular, by maintaining the quantity $$\frac{R_1 - R_2}{R_2}$$

constant, it is possible by varying $R_1$ to obtain a switch-over which permits of linear measurement over a wider range.

Compared with the known circuits comprising two measuring channels, the circuit according to the invention offers the advantage of dispensing with a detector, a cable, a high voltage supply, a low voltage supply, a linear amplifier and additionally requires only the two single amplifiers B and C.

It is readily apparent that the two outputs of the circuit can be equipped with triggers.

From the point of view of reliability of operation, some some advantages are to be gained by the use of two separate chains but the device according to the invention ensures good operation in linear measurement as soon as good performance of the logarithmic measuring chain is achieved; in addition, a "two out of three" device can very easily be installed both on the linear outputs and on the logarithmic outputs of three identical circuits.

The principle herein described applies to the pulse-measuring channels when these latter are treated by integration with a D.C. amplifier.

The limiting conditions of use of the circuit are set by the limited gain of the amplifier A. If this gain is G, the response is written:

$$-V_2\left(\frac{1}{G}+1\right)=R_1I+K\log\left(\frac{I}{I_0}\frac{R_1+R_2}{R_2}+\frac{-V_2}{GR_2i_0}\right)$$

from which it is apparent that, in order to comply with the logarithmic law, it is necessary to ensure that $$GI(R_1+R_2)\gg V_2$$

The above condition, which can always be fulfilled in practice, must be strictly complied with and governs the choice of one of the resistors $R_1$ or $R_2$.

It should be noted that the current I is multiplied by the factor $$\frac{R_1+R_2}{R_2}$$

This can permit the measurement of smaller currents than those which are usually permitted by the diodes employed. Thus, by means of a diode which is limited to $10^{-11}$ A, it will be possible to measure $10^{-13}$ A by establishing $$\frac{R_1+R_2}{R_2}=100$$

while complying with the condition mentioned above. This property of the circuit can prove useful for the measurement of currents of very low intensity ($10^{-13}$ A., for example) whereas, up to the present time, such measurements could only be taken by means of vacuum-tube electrometers. It will therefore be possible to make use of semiconductor diodes of a conventional type and to gain one, two or three decades towards the weak currents. The application of this principle is useful in radiation protection instruments.

The circuit according to the invention has been tested under the following conditions:

$i_0=10^{13}$ amp.
$R_1=10^4$ ohms.
$R_2=10^7$ ohms.
K=0.06 (transistor 2 N 930 mounted as a diode)
Gain over amplifier C=10

The above test has led to the following results:

| I Amps | $10^{-11}$ | $10^{-10}$ | $10^{-9}$ | $10^{-8}$ | $10^{-7}$ | $10^{-6}$ | $10^{-5}$ | $10^{-4}$ | $10^{-3}$ |
|---|---|---|---|---|---|---|---|---|---|
| $V_1$ (linear calculated volts) | $10^{-7}$ | $10^{-6}$ | $10^{-5}$ | $10^{-4}$ | $10^{-3}$ | $10^{-2}$ | $10^{-1}$ | 1 | 10 |
| $V_1$ (linear measured volts) | | | | | $10^{-3}$ | $10^{-2}$ | $10^{-1}$ | 1 | 10 |
| $V_3$ (logarithmic calculalted volts) | 1.2 | 1.8 | 2.4 | 3.0 | 3.3 | 4.2 | 4.8 | 5.4 | 6.0 |
| $V_3$ (logarithmic measured volts) | 1.2 | 1.8 | 2.4 | 3.1 | 3.7 | 4.3 | 4.9 | 5.5 | 6.1 |

It should be pointed out that, in the case of a small number of decades and especially in the case of weak currents, it can be of interest to employ only the circuit of FIG. 1, this being particularly the case with portable instruments (radiation protection instruments, for example).

In this case, in respect of the values $R_1=10^8$, $R_2=10^6$, $i_0=10^{11}$ A., K=0.1, we may have the following results:

| I Amps | $10^{-13}$ | $10^{-12}$ | $10^{-11}$ | $10^{-10}$ |
|---|---|---|---|---|
| $V_2$ | 0 | 0.1 | 0.2 | 0.31 |

What we claim is:

1. An electronic circuit providing simultaneously two voltages a first of which is linear and the second of which is logarithmetic with respect to an input current, a first output for said circuit for the first voltage, a second output for said circuit for the second logarithmetic voltage, an amplifier connected in said circuit, an output for said amplifier, a resistance connected across said input and said output of said amplifier including a diode having a logarithmic characteristic, said first output being connected between said diode and said resistance, an operational amplifier, an input for said operational amplifier connected to the output of said amplifier and receiving the second voltage, a phase-inverting amplifier, an input for said phase-inverting amplifier connected to said first output and receiving said first voltage, an output for said phase-inverting amplifier connected to the input of said operational amplifier and an output for said operational amplifier forming said second output and providing the second logarithmetic voltage.

References Cited
UNITED STATES PATENTS 3,187,325   6/1965   Waldhauer _____ 330—110
3,329,836   7/1967   Pearlman _____ 307—229

DONALD D. FORRER, Primary Examiner

D. M. CARTER, Assistant Examiner

U.S. Cl. X.R.

307—230; 330—110